United States Patent [19]
Hunter

[11] 3,884,264
[45] May 20, 1975

[54] CONDITION SENSING APPARATUS AND VALVE THEREFOR

[75] Inventor: Bryan J. Hunter, Boulder, Colo.

[73] Assignee: E. F. Industries, Inc., Louisville, Colo.

[22] Filed: Sept. 19, 1973

[21] Appl. No.: 398,640

Related U.S. Application Data

[62] Division of Ser. No. 217,777, Jan. 14, 1972, Pat. No. 3,777,698.

[52] U.S. Cl. ........... 137/624.14; 251/28; 116/118 R; 116/70
[51] Int. Cl. ............................................. G01f 23/00
[58] Field of Search .......................... 251/45, 44, 28; 137/624.14; 116/70, 118 R

[56] References Cited
UNITED STATES PATENTS
2,387,225  10/1945  Beekley ............................. 251/45
2,875,778  3/1959  Hair ......................... 137/624.14 X FOREIGN PATENTS OR APPLICATIONS
217,188  9/1961  Austria ............................. 251/45

*Primary Examiner*—Alan Cohan
*Attorney, Agent, or Firm*—Burton, Crandell & Polumbus

[57] ABSTRACT

An apparatus for sensing and indicating the presence of a particular condition such as, for example, the level of a liquid within a container. Said apparatus includes a sensor means or a probe suitably positioned such as within the container. When the particular condition is sensed, such as a predetermined change of liquid level within the container, the sensor means or probe produces and/or transmits a suitable input signal such as a fluid input signal to a non-bleed amplification valve separated into a plurality of passages and chambers by a force responsive means arrangement such as a diaphragm arrangement. The force responsive means arrangement, passages and chambers in cooperation with one another and with a supply of fluid under pressure provide an amplified fluid output signal (relative to the magnitude of the fluid input signal) in response to the presence of the fluid input signal. The fluid input signal is cyclically generated upon continued application of the input signal and, thus, the apparatus functions as a pneumatic oscillator. The apparatus includes means for controlling the cycling period of said output signal. The fluid output signal may be applied, for example, to an audio alarm for indicating that the liquid in the container has reached the aforestated predetermined level. The valve assembly does not expend any fluid energy or require the input of any power when same is in a quiescent state.

14 Claims, 7 Drawing Figures

CONDITION SENSING APPARATUS AND VALVE THEREFOR

CROSS-REFERENCE TO RELATED APPLICATION

This is a division of application Ser. No. 217,777 filed Jan. 14, 1972, now U.S. Pat. No. 3,777,698 issued Dec. 11, 1973.

BACKGROUND OF THE INVENTION

1. Field of the Invention

The present invention relates generally to sensing devices and a valve assembly therefor, and more particularly to a sensing device utilizing therein a fluid operated valve assembly.

2. Description of the Prior Art

Today, there are, of course, many different approaches in sensing and indicating the presence of a particular condition. Whether a particular approach displays the necessary degree of accuracy and/or reliability or whether it is economically feasable and/or practical will, for the most part, depend upon the specific intended use. One such use is to sense and indicate the presence of a predetermined level of liquid within a container.

Many factors contribute to the success or failure of a liquid level monitoring device. One such factor is the environment in which the device is placed. For example, in environments including potential pollutants, such as highly combustible fluids like oil and the like, electrical monitoring devices or devices capable of producing sparks may be potential explosion-initiating hazards. Some devices utilize valve assemblies requiring the continuous supply of pressurized fluid. Other devices utilize valve assemblies requiring a relatively large power signal initially to actuate same. It has been found that most liquid level monitoring devices heretofore used, especially those used for monitoring the level of oil, petroleum or other such potential pollutants, leave room for improvement in both construction and operation.

SUMMARY OF THE INVENTION

The present invention provides a new and improved monitoring or condition sensing system and a valve assembly therefor. One object of the invention is to provide a system that is uncomplicated in design, reliable in use and economical to produce.

Another object of the present invention is to provide a new and improved fluid operated monitoring system which may be safely used in a potentially hazardous environment.

Another object of the present invention is to provide a fluid operated monitoring system including a new and improved fluid operated valve assembly.

Another object of the present invention is to provide a system of the last-mentioned type, which, in response to a relatively small increase in fluid pressure, produces an amplified output burst of fluid pressure.

Another object of the present invention is to provide a system of the last-mentioned type which is adapted for accurate and reliable monitoring of the level of a liquid such as, for example, a potential pollutant within a container.

Another object of the present invention is to provide a system of the last-mentioned type which is adapted for producing intermittent output bursts of fluid pressure in response to the presence of a predetermined level of liquid within a container.

Another object of the present invention is to provide a system of the last-mentioned type which utilizes a remotely positioned sensor and which provides intermittent bursts of fluid under pressure towards the sensor for purging the latter of any potential obstructions.

Another object of the present invention is to provide a new and improved fluid operated monitoring system which includes means for minimizing the amount of fluid required to operate the system.

Another object of the present invention is to provide a new and improved non-electrical fluid operated monitoring system which may be safely used in an environment containing combustible fluids.

Another object of the present invention is to provide a new and improved fluid operated valve which, in response to a fluid input signal, produces an amplified fluid output signal.

Another object of the present invention is to provide a valve of the last-mentioned type including a diaphragm arrangement for producing the aforestated amplified fluid output signal in response to the co-presence of the aforestated input signal and a supply of pressurized fluid within the valve.

Another object of the present invention is to provide a new and improved fluid operated valve adapted for connection with a condition indicative sensor and including means for purging the sensor of potentially obstructing material.

Another object of the present invention is to provide a new and improved fluid operated valve including feedback means and adapted to produce intermittent output bursts of fluid under pressure in response to a fluid input signal.

Another object of the present invention is to provide a valve of the last-mentioned type including means for regulating the time between the aforestated intermittent output bursts.

Another object of the present invention is to provide a valve of the last-mentioned type including a diaphragm arrangement wherein the amount of fluid required for powering the valve is minimized.

Another object of the present invention is to provide a new and improved fluid operated valve including a plurality of cooperating chambers and a diaphragm arrangement separating various areas of the chambers so that the valve, in response to the presence of a fluid input signal and a supply of fluid under pressure within the various chambers, produces an amplified fluid output signal.

Another object of the present invention is to provide an apparatus for sensing a particular condition comprising a valve assembly including first, second and third chambers, said second and third chambers each having input means to receive a supply of pressurized fluid and direct said pressurized fluid into said second and third chambers, said third chamber having an outlet passage constructed to be disposed in fluid communication with and leading away from said third chamber, and first and second movable members, said first member movable between a first biased position for fluid sealing said first chamber from said second chamber and a second position for allowing fluid communication between said first and second chambers, said second member movable between a first biased position for fluid sealing said third chamber from said outlet passage and a second position for allowing fluid communication between said third chamber and the outlet passage leading away from said third chamber, said second member being adapted to move from its first position to its second position in response to the movement of said first member from its first position to its second position thereby producing an alarm initiating or actuating signal by allowing pressurized fluid within said third chamber to escape therefrom through the outlet passage leading away from said third chamber, and sensor means adapted for sensing a particular condition and transmitting an input signal in response thereto, said sensor means including means operably connected with said first member and responsive to the presence of said input signal for at least momentarily moving said first member from its first position to its second position in response to the transmission of said input signal.

Another object of the present invention is to provide an apparatus as aforesaid in which the means of said sensor means includes a force transmitting member connected to said first movable member.

Another object of the present invention is to provide an apparatus as aforesaid in which the means of said sensor means includes a force generating member disposed adjacent a portion of said first movable member.

Another object of the present invention is to provide an apparatus as aforesaid in which the first movable member is a pressure responsive member, and the means of said sensor means includes a fluid passage disposed in fluid communication with a portion of one side of said first movable member.

Another object of the present invention is to provide an apparatus as aforesaid in which said valve assembly includes a fourth chamber, said first movable member is a pressure responsive member and said first member fluid seals said first chamber from said fourth chamber, and in which the means of said sensor means includes a fluid passage disposed in fluid communication with a portion of one side of said first movable member.

Another object of the present invention is to provide an apparatus as aforesaid in which the valve assembly includes means for terminating intermittently production of said alarm initiating signal.

Another object of the present invention is to provide an apparatus as aforesaid in which the valve assembly includes means for controlling the cycling period of said alarm initiating fluid signal.

Another object of the present invention is to provide an apparatus as aforesaid in which the valve assembly includes means for controlling the duration of the alarm initiating signal.

These and other objects and features of the present invention will become apparent from the following descriptions.

DETAILED DESCRIPTION

Figure 2:
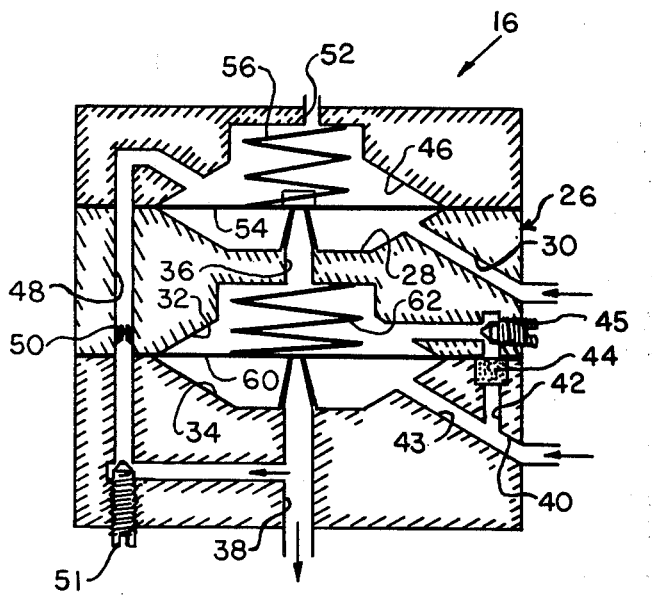
FIG. 2 is a schematic diagram of a fluid operated valve which is used in the system illustrated in FIG. 1 and which is constructed in accordance with the present invention.

The present invention is directed to an apparatus for sensing a particular condition such as a pressure sensitive alarm system which, among other uses, is readily adaptable for use as a liquid overflow alarm to help prevent, for example, the overfilling and subsequent spills of liquids from marine tankers, barges, lighters, tank cars and/or truck and land based tanks. In this regard, the present invention provides an excellent anti-pollution device which, as will be seen hereinafter, is nonhazardous, non-electrical and intrinsically safe as well as reliable in operation, uncomplicated in design and economical to manufacture. The present invention is also directed to a valve assembly suitable for use in such an apparatus.

A preferred embodiment of a pressure sensitive alarm system constructed in accordance with the present invention includes an elongated hollow probe or sensor opened at one end and connected at its other end with a pressure operated amplification valve through a suitable conduit. The probe or sensor is set at a predetermined level within a tank such as, for example, a marine tanker which may carry liquid such as oil or another potential pollutant.

In the event that the level of liquid within the tank increases to the level of the probe so as to enter into the open end thereof, the gas within the probe is compressed and thus the pressure within the probe increases slightly, thereby creating a pneumatic input signal. Thus, a slight increase in gas pressure or input signal is transferred through the aforestated thereto, produces an alarm initiating signal in the form of an amplified burst of gas under pressure that, in turn, is used to initiate an audio alarm.

In accordance with the present invention, the amplification valve is divided, preferably, by an arrangement of movable means such as pressure responsive means including also pistons and diaphragms, into a plurality of cooperating chambers, one of which is adapted to receive the foregoing increase in air pressure or pneumatic input signal while others of which receive gas such as, for example, pressurized carbon dioxide from an external supply. The arrangement of the movable means, in response to the co-presence of the input signal and gas under high pressure within the various chambers, causes the production of the foregoing amplified burst of gas under pressure for initiating the audio alarm. In addition, a second or probe purging burst of gas is directed back to the probe through the probe connecting conduit, thereby blowing the liquid and any potential conduit obstructing elements out of the open end of the probe. It will be observed that prior to the production of the aforestated burst of gas the amplification valve is of the non-bleed type, i.e., it does not require the continuous supply of pressurized gas, in its quiescent state, to permit functioning or operation thereof.

In addition to the foregoing, a preferred embodiment of the amplification valve constructed in accordance with the instant invention includes a feedback arrangement adapted to terminate intermittently the production of the aforestated alarm initiating signal during presence of the pneumatic input signal within the valve. As will be seen hereinafter, this procedure in combination with the no bleed feature minimizes the amount of pressurized gas needed to power the amplification valve which, as a result, permits the use of a more economical, more compact and lighter weight gas pressure supply. As will also be seen hereinafter, the probe is intermittently purged in the aforedescribed manner.

From the foregoing, various advantages to the pressure sensitive alarm system of the present invention should be apparent. Firstly, the system can operate exclusively by and in response to noncombustible fluid pressure and does not require potential combustion initiative components such as, for example, electrical components or potentially spark generating components. This is, of course, very important where the system is positioned in a hazardous atmosphere such as in an oil filled tank. Secondly, by intermittently purging the probe or sensor of liquid and potential obstructions, operational reliability is enhanced. Thirdly, intermittent termination of the alarm initiating signal along with use of a non-bleed type amplification valve conserves the amount of gas under pressure required to operate the amplification valve and output signal thus enabling the alarm to be operated over a relatively long period of time for a given amount of pressurized gas.

This invention also relates to an apparatus for sensing a particular condition including a sensor means for sensing a particular condition and transmitting an input signal in response thereto in combination with a valve assembly having a plurality of chambers and movable means arrangement for separating said chambers one from the other. The sensor means includes means operably connected with the movable means arrangement and responsive to the presence of said input signal for at least momentarily moving said means arrangement from a first to a second position in response to the transmission of said input signal. The means of said sensor means comprises, for example, a force transmitting member, such as a fine wire attached to a portion of the movable means arrangement, or a force generating member, such as coil of wire capable of creating a magnetic field when an electric current is passed therethrough, or a fluid passage disposed in fluid communication with a portion of one side of said first movable member (the fluid passage may be used to transmit either a vacuum signal or a pressurized fluid signal).

In addition to the foregoing advantages of the alarm system of the present invention, other advantages thereof will become apparent from the following description of the drawings wherein like components are designated by like reference numerals throughout the various figures.

Figure 1:
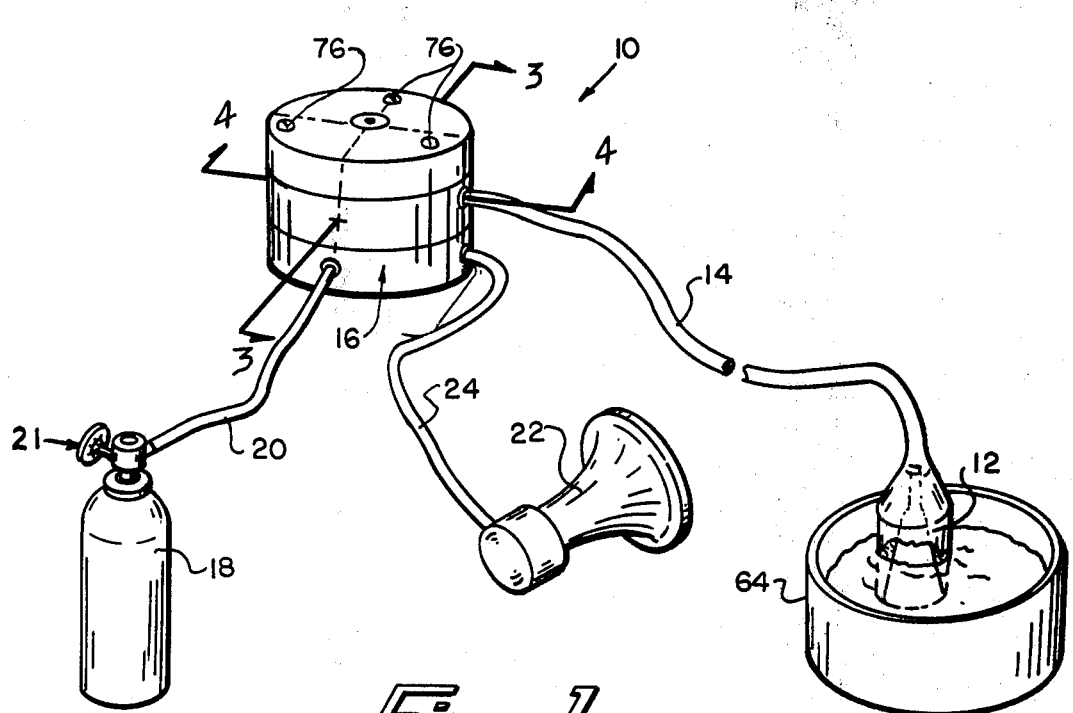
FIG. 1 is a perspective view of a fluid pressure sensitive alarm system constructed in accordance with the present invention.

Turning now to the drawings and particularly to FIG. 1, a pressure sensitive alarm system, constructed in accordance with the present invention, is illustrated and generally designated by the reference numeral 10. The system includes a probe or sensor 12 in the form of, for example, an elongated hollow cylinder or tube connected at one end to and in fluid communication with one end of a conduit 14 having a cross-sectional diameter substantially smaller than the cross-sectional diameter of the probe.

In one working embodiment of the instant invention, probe 12 is constructed of a three-quarter inch diameter polyfluoroethylene (Teflon) rod having a tapered bore formed therein and adapted to operate in liquids having a temperature range from approximately −20° to 350° F, as well as all hydrocarbons, most corrosive materials, asphalt and many other liquid materials. In a similar manner, conduit 14 is constructed of a one-eighth inch (outer diameter) polyfluoroethylene (Teflon) tube. In this regard, unless otherwise indicated, it is to be understood that any reference herein to specific dimensions or material is for purposes of illustrating a working and/or preferred embodiment and is not intended to limit the present invention.

As illustrated in FIG. 1, the otherwise "free" end of conduit 14 is connected to and in fluid communication with a fluid operated amplification valve 16. The valve 16 is powered by a supply 18 of preferably noncombustible gas under pressure such as carbon dioxide or the like, which is directed to the valve 16 through a conduit 20 and pressure regulator-control valve 21. An audio alarm such as a horn 22 displaying a sound intensity of, for example, 120 db is connected in fluid communication with the output valve 16 by a suitable conduit 24. Operationally, a pneumatic input signal in the form of, for example, an increase in pressure within probe or sensor 12 caused by, for example, a liquid entering into and filling the open end thereof is transmitted to the amplification valve 16. The valve 16, in response to the presence of the input signal, produces at its output pulsed alarm initiating signals in the form of intermittent bursts of pressurized carbon dioxide, which carbon dioxide is initially supplied to the valve 16 by gas supply 18 through conduit 20.

The pulsed output signals, which are amplified relative to the pneumatic input signal, are applied to horn 22 through conduit 24 for providing a high intensity pulsating audio signal. In a working embodiment of the present invention, it was found that the audio signal could be heard over five hundred feet away in an environment having high ambient noise conditions. In addition to these output signals, valve 16 also provides intermittent bursts of pressurized carbon dioxide back to probe 12 through conduit 14 for clearing same both of any possible obstructions and also to check whether, for example, the pressure generating condition still exists.

It is to be understood that while carbon dioxide is described as the gas contained within the gas supply 18, any suitable pressurized fluid, preferably noncombustible, may be used for powering the valve 16. Further, the term "pneumatic signals" as used herein shall refer to gas signals generally and should not be limited to air signals. It is also to be understood that the output bursts of pressurized gas are not limited to blowing or initiating a horn 22. The system 10 may be provided with, for example, a conventional pneumatically actuated visible signal mechanism (not shown) and/or a miniature sending device (not shown).

Turning now to FIG. 2, attention is directed to amplification valve 16, which for purposes of clarity, is shown schematically. As illustrated, the valve 16 includes a solid housing 26 defining a plurality of cooperating chambers and passages therein. One such chamber is an annular input signal receiving chamber 28 which is in continuous fluid communication with one end of an input signal passage 30 extending through the housing 26 and adapted to receive the input signal from conduit 14 (see FIG. 1) so as to direct the signal into the chamber 28.

Spaced from chamber 28 is a coupling chamber 32 and an adjacent fluid connected output amplification chamber 34. Chamber 32 is constructed to be disposed in fluid communication with the input signal receiving chamber 28 through an elongate passage 36 extending between the two. On the other hand, output amplification chamber 34 is constructed to be disposed in fluid communication with one end of an output passage 38 which extends through the housing 26 for directing the aforedescribed alarm initiating output signal to horn 22 (see FIG. 1) through conduit 24. Both chambers 32 and 34 are adapted to receive pressurized gas from gas supply 18. In this regard, a gas supply input passage 40 is defined in the housing 26 as illustrated in FIG. 2, and, as will be seen hereinafter, is disposed in fluid communication with the gas or power supply conduit 20. The other end of the passage 40 is in continuous fluid communication with two parallel passages 42 and 43 which respectively extend into chambers 32 and 34. In this manner, a single supply 18 can be utilized for simultaneously supplying pressurized gas to the two chambers 32 and 34. The passage 42 includes flow restricting means comprising a filter 44 and an adjustable screw or needle type valve 45. The use of such means has for its purpose to control, at least in part, the cycle period of the alarm initiating output signal and also the length of duration of the alarm initiating output signal. The length of duration of the alarm initiating signal is increased by decreasing the rate of flow of pressurized gas through passage 42. The filter also protects the apparatus from malfunctioning by preventing particulate matter from entering into chamber 32.

Housing 26 also defines a feedback chamber 46 positioned adjacent to the input signal receiving chamber 28. As will be seen hereinafter, chamber 46 is adapted to receive a portion of the alarm initiating output signal for the purpose of terminating the latter shortly after production thereof. In this regard, a feedback passage 48 in fluid communication at one end with output passage 38 extends through the housing 26 and into chamber 46. However, a one-way check valve 50 is suitably positioned within passage 48 for allowing fluid movement only in a direction toward chamber 46. Moreover, feedback passage 48 includes a flow restrictive means in the form of an adjustable screw or needle type valve 51. In addition to feedback passage 48, chamber 46 is in fluid communication with a bleed passage 52 which extends out of housing 26 and which is provided for reasons to be described hereinafter.

By proper selection of the size of the bleed passage 52 in combination with the positioning of the flow restrictive means 45 and 51, control of the cycle period of the alarm actuating or initiating output signal is effected. It will also be observed that the length of duration of the alarm actuating signal is affected by the positioning of the flow restrictive means 45 and 51. For example, the greater the degree of restriction of flow through passages 42 and 48, the longer will be the duration of the alarm actuating signal.

As illustrated in FIG. 2, a first movable pressure responsive closure member 54, which is preferably a diaphragm, is positioned within housing 26 and fluid seals input signal receiving chamber 28 from feedback chamber 46. The diaphragm 54 is suitably mounted for movement between a first position (as shown in FIG. 2) for fluid sealing chamber 28 from passage 36 and a second position (not shown) for allowing fluid communication between the last-mentioned chamber and passage. A suitable biasing means such as, for example, a spring element 56 is positioned within the feedback chamber 46 for biasing the diaphragm 54 in the aforesaid first position. It will be observed that no pressurized gas bleeds or passes through passage 36 except only when the diaphragm 54 is in its second position.

A second pressure responsive movable closure member 60, which is also preferably a diaphragm, is positioned within housing 26 for generally fluid sealing amplification chamber 34 from coupling chamber 32, it being kept in mind that passages 42 and 43 interconnect said chambers. This diaphragm 60, like diaphragm 54, is suitably mounted for movement between a first position for fluid sealing output passage 38 from chamber 34 and a second position for allowing fluid communication between the two. A second suitable biasing means such as, for example, a spring element 62 is positioned within coupling chamber 32 for biasing diaphragm 60 in its first position.

With amplification valve 16 constructed as aforesaid, attention is directed to the manner in which it operates as a part of, for example, a pressure sensitive liquid level alarm system. Specifically, the probe or sensor 12 can be disposed within a container 64 in the manner illustrated in FIG. 1. When liquid within the container 64 rises to a level so as to enter the open end of the probe 12, the liquid therein compresses the gas within the probe 12 thereby creating a pneumatic input signal. This compression of gas or pneumatic input signal is transferred to annular chamber 28 through conduit 14 and input passage 30, thereby increasing the pressure within this chamber.

In most operations of the type described, the pneumatic input signal will be small causing only a slight increase in the pressure within the input signal receiving chamber. Accordingly, chamber 28, diaphragm 54 and spring element 56 may be suitably designed such that the diaphragm 54 moves from its biased fluid sealing first position to its second position in response to the aforestated slight increase in pressure within chamber 28. It should be understood, of course, that the chamber 28, diaphragm 54 and/or spring element 56 can be designed such that the diaphragm 54 moves to its second position in response to a greater or lesser increase in pressure chamber 28. For example, the spring element 56 could be made stiffer for requiring a larger increase in chamber pressure before the diaphragm 54 moves from its biased first position.

During operation of the system 10, chambers 32 and 34 are maintained by supply 18 at substantially equal constant pressures of, for example, 30 to 40 psi but, in any case, at pressures greater than the aforestated increase in pressure of chamber 28. When the diaphragm 54 moves from its first position to its second position in response to the aforestated pneumatic input signal, the passage 36 is opened to chamber 28. When this occurs, the high pressure gas within chamber 32 and passage 36 flows into chamber 28 and through passage 30 thereby purging conduit 14 and probe 12 of any liquid and/or potential obstructing foreign matter. At the same time, there is a corresponding drop of pressure within chamber 32. This is due to the relative sizes of passage 36 and the annular restriction at the seat of flow restrictive means 45. Specifically, the rate of flow through passage 36 must be greater than the rate of flow through passage 42 so that the pressurized gas escapes from the chamber 32 at a faster rate than it is supplied through passage 42 from supply 18.

The foregoing drop in pressure within chamber 32 results in an upset of the forces acting across diaphragm 60 due to the greater relative pressure within chamber 34. The chamber 34, spring element 62 and diaphragm 60 are designed such that the latter moves from its biased fluid sealing first position to its second position in response to this upset in forces, thereby opening output passage 38 to chamber 34. When this happens, high pressure gas, i.e., an alarm initiating or actuating output signal, moves from supply 18 through conduit 20, passages 40 and 43 into chamber 34 and out passage 38 whereupon it may be used to actuate horn 22.

From the foregoing, it should be apparent that the horn 22 will provide a substantially continuous audio signal so long as the level of liquid within container 64 is above the free end of probe 12 by a specified amount. As should also be apparent, this causes the utilization of a large amount of pressurized gas from supply 18. Accordingly, as will be seen hereinafter, valve 16 utilizes a feedback approach for intermittently sealing output passage 38 and thereby terminating the output signal regardless of the continued presence of an input signal. In this manner, gas from supply 18 is only intermittently used for actuating horn 22.

The aforesaid feedback approach utilizes feedback passage 48, one-way valve 50, flow restrictive means 51, chamber 46 and bleed passage 52. Specifically, as the high pressure gas escapes from chamber 34 through output passage 38, a portion thereof is directed to chamber 46 through feedback passage 48. This causes an increase in pressure within the feedback chamber 46 which forces the diaphragm 54 back to its biased fluid sealing first position regardless of the presence of an increase in pressure within chamber 28 caused by the compression of gas within probe 12. With diaphragm 54 in its first position, passage 36 is sealed off so that the pressure within coupling chamber 32 begins to build up. This pressure buildup eventually causes diaphragm 60 to move back to its first position for sealing off output passage 38 and terminating the alarm initiating output signal. The time required to build up this pressure within chamber 32 is dependent upon the restrictive effect of the filter 44 and valve 45, i.e., the greater the degree of restrictive effect presented, the longer will be the time required to build up the pressure in chamber 32.

Termination of the output signal also terminates passage of all pressurized gas back to feedback chamber 46. At this time, the high pressure gas within chamber 46 is allowed to completely dissipate through bleed passage 52 thereby reducing the pressure within the chamber. When the pressure has been reduced a sufficient amount, the diaphragm 54 can again move back to its second position in response to an increased pressure within chamber 28. In this manner, the aforedescribed operational sequence will repeat itself as long as the pressure within chamber 28 is at the aforedescribed increased level and there is a sufficient amount of gas within supply 18. It should be noted that the rate at which the high pressure gas escapes from feedback chamber 46 depends upon the size of bleed passage 52. Accordingly, the repetition rate of the aforementioned operational sequence is dependent upon the size of passage 52. Hence, the repetition rate can be of a predetermined value by appropriately sizing the passage 52. It should be apparent, however, that the repetition rate will also depend upon the presence of a pneumatic input signal. In view of the foregoing, it will be understood that by proper selection of the bleed passage 52 the amount of time required to dissipate the pressure within chamber 46 can be much longer than the amount of time required to build up pressure within chambers 32 and 46. Further, such an arrangement contributes to a conservation of the pressurized gas within supply 18 thereby increasing the time span over which the alarm system will function for a predetermined quantity of pressurized gas within supply 18.

Figure 3:
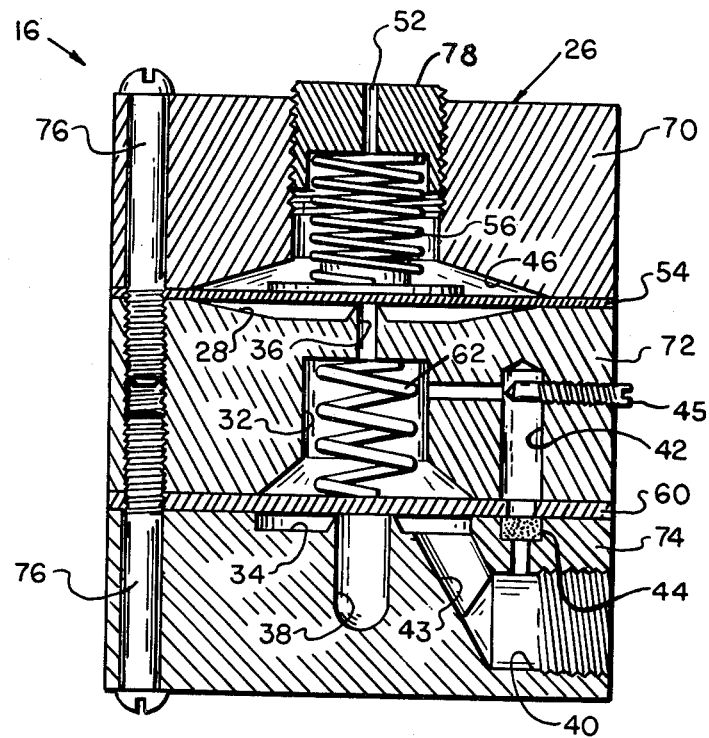
FIG. 3 is a vertical sectional view of the valve taken along line 3—3 in FIG. 1.
Figure 4:
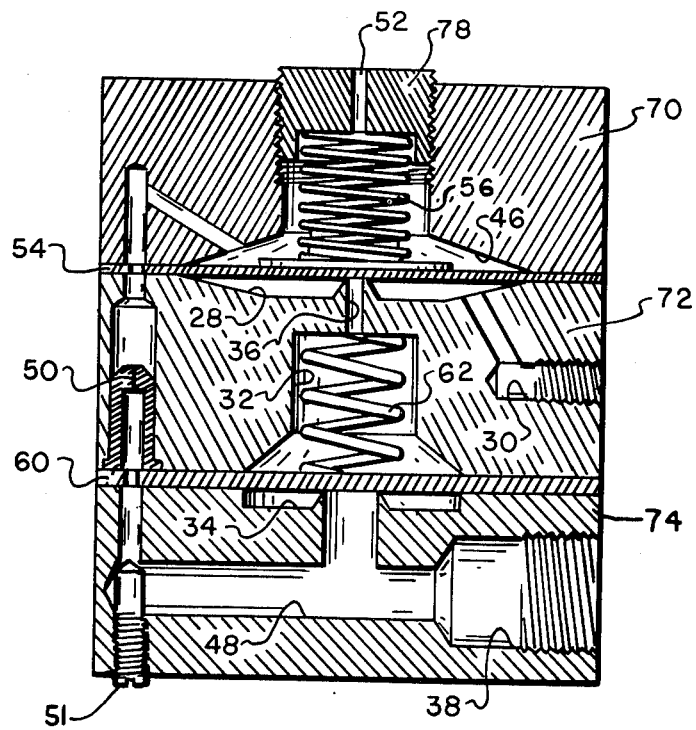
FIG. 4 is a vertical sectional view of the valve taken along line 4—4 in FIG. 1.

Turning now to FIGS. 3 and 4, attention is directed to a working embodiment of the amplification valve 16, as illustrated by vertical sectional views taken, respectively, generally along lines 3—3 and 4—4 in FIG. 1. As shown, housing 26 of the valve 16 is separated into three disc-shaped portions 70, 72, and 74, which fit together in a layered fashion so that the various aforedescribed chambers, passages, diaphragms and spring elements cooperate in the foregoing stated manner. The disc-shaped portions are fastened together by, for example, a plurality of elongated bolts 76 extending into the disc-shaped portions through cooperating threaded apertures provided in the latter.

Each of the diaphragms 54 and 60 is also disc-shaped displaying a diameter substantially equal to the diameters of the various disc-shaped portions of housings 26. Before the valve is assembled, the diaphragm 54 is centrally positioned between portions 70 and 72 while diaphragm 60 is centrally positioned between portions 72 and 74, as illustrated in FIGS. 3 and 4. In this regard, the diaphragms include openings near their outer edges to allow passage therethrough of the various bolts 76. In this manner, when the various parts of the valve 16 are assembled together, the diaphragms are held in the aforedescribed position so as to function in the foregoing stated manner.

As illustrated in FIGS. 3 and 4, input passage 30, output passage 38 and gas supply receiving passage 40 each includes an internal threaded portion. In this manner, the probe connecting conduit 14, horn connecting conduit 24 and external gas supply connecting conduit 20 may be provided with cooperating external threaded portions so that the conduits can be securely fastened in a fluid sealed manner to the amplification valve such that the conduits are in fluid communication with the respective passages 30, 38 and 40.

As also illustrated in FIGS. 3 and 4, the bleed passage 52 is preferably provided through a separate cylindrically shaped element 78 having external fluid sealing threads defined about its circumference. The cylindrical element 78 is threaded within a cooperating internally threaded passage defined in disc-shaped portion 70 so that bleed passage 52 is in fluid communication with feedback chamber 46. In this manner, the size of bleed passage 52 can be changed for the purpose of changing the repetition rate of system 10, without replacing an entire disc-shaped portion. In this regard, in one working embodiment, the bleed passage 52 is provided through element 78 by a number 79 drill bit so that it takes approximately three seconds for the feedback pressurized gas to dissipate from chamber 46 to a sufficient degree for allowing diaphragm 54 to move to its second position in response to a pneumatic input signal. Hence, there will be a 3 second delay between audio signals.

While amplification valve 16 has been illustrated in FIGS. 3 and 4 with a cylindrical housing defining various chambers and passages, it is to be understood that the present invention is not limited to a particular size or shape of housing. For example, the various passages, rather than being defined within the housing, could be defined at least partially by separate conduits. Further, the various aforedescribed chamber, passages, diaphragms and spring elements may be of any suitable size and/or shape so long as they cooperate in the aforedescribed manner. In addition, while the amplification valve has been described with respect to gas operation, it should be apparent that the valve could operate on liquid pressures for producing an output burst of pressurized liquid in response to an input burst of pressurized liquid.

Figure 5:
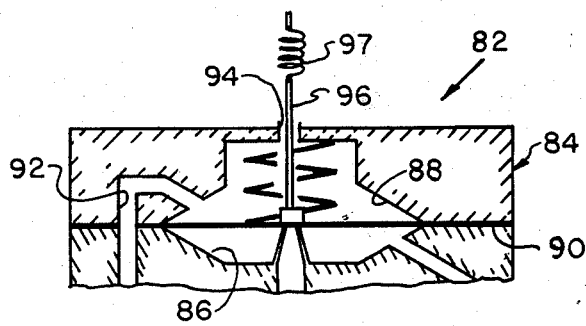
FIG. 5 is a schematic diagram of a portion of an apparatus for sensing a particular condition constructed in accordance with this invention.

In FIG. 5 is shown another apparatus constructed in accordance with this invention. The apparatus 82 comprises an amplification valve assembly 84 and a sensor means (not completely shown). The valve assembly 84 comprises a first chamber 86, second and third chambers (not shown), fourth chamber 88, a first movable member 90 and a second movable member (not shown). The second and third chambers each have input means (similar to the input means 42 and 43 shown in FIGS. 2–4) to receive a supply of pressurized fluid and direct said pressurized fluid into said second and third chambers. The third chamber has an outlet passage constructed to be disposed in fluid communication with and leading away therefrom in much the same manner as output passage 38 shown in FIGS. 2–4. The fourth chamber has an input passage 92 disposed in fluid communication with said outlet passage (not shown) and also a bleed output passage 94 leading away therefrom. The first movable member 90 fluid seals the first chamber 86 from the fourth chamber 88. The first member 90 is also movable between a first biased position (as shown in FIG. 5) for fluid sealing said chamber 86 from said second chamber and a second position (not shown) for allowing fluid communication between said first and second chambers. The second member is movable between a first biased position (not shown) for fluid sealing said third chamber from the outlet passage leading away from said third chamber and a second position (not shown) for allowing fluid communication between said third chamber and the outlet passage leading away from said third chamber. The second member is adapted to move from its first position to its second position whereby to allow pressurized fluid within said third chamber to escape therefrom through the outlet passage leading away from said third chamber. The sensor means is adapted for sensing a particular condition and transmitting an input signal in response thereto. The sensor means includes means 96 operably connected with the first member 90 and responsive to the presence of the input signal for at least momentarily moving the first member 90 from its first position in response to the transmission of said input signal. The means 96 also includes suitable means, such as an expansion spring 97 to permit the first member 90 to move back to its first position even though the input signal is still being transmitted along means 96.

The apparatus 82 may be used in a number of instances in which it may be inappropriate or undesirable to use the apparatus 10. Apparatus 82 is particularly useful in those situations where the sensing of a particular condition results in the generation of an input signal that can be used to produce a tensile force in the means 96.

Figure 6:
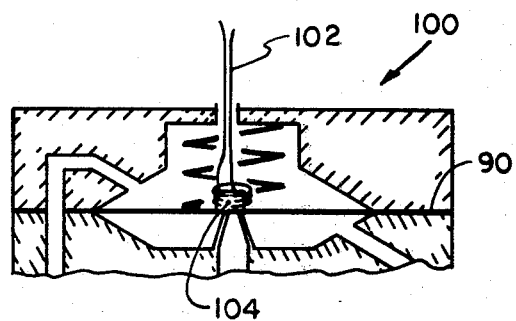
FIG. 6 is a view similar to FIG. 5 showing another apparatus constructed in accordance with this invention.

In FIG. 6 is shown another apparatus constructed in accordance with this invention. The apparatus 100 is generally similar in construction to apparatus 82 except for the substitution of a force generating member 102 for the means 96. The force generating member 102 is shown as a coil of wire capable of creating a magnetic field when an electric current is passed therethrough. Since only a very small force is required to move the member 90, the passage of a small current through the coil of wire, which is disposed about a cylindrically shaped piece of ferrous metal 104 that is attached to the upper surface of member 90, will cause movement of member 90. It is estimated that substantially less than one watt of electrical energy is required to cause movement of one construction of member 90.

The apparatus 100 may be used in a number of applications in which it may be inappropriate or undesirable to use either of the apparatuses 10 or 82. Apparatus 100 is particularly useful in those situations where the sensing of a particular condition results in the generation of an electrical signal.

Figure 7:
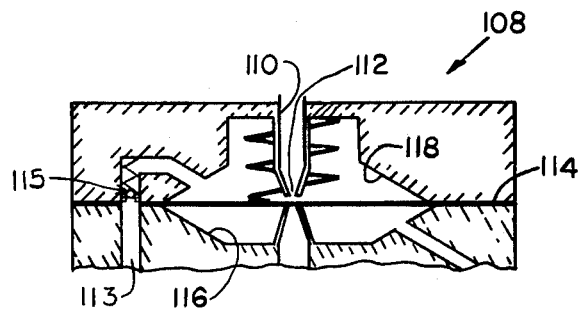
FIG. 7 is a view similar to FIG. 5 showing another apparatus constructed in accordance with this invention.

In FIG. 7 is shown another apparatus constructed in accordance with this invention. The apparatus 108 is generally similar in construction to the apparatus 82 except for the use of a passage 110 in lieu of the means 96. The passage 110 includes a flow restrictive means 112 which acts substantially as a bleed passage and, as shown, is smaller in cross-sectional area than the feedback passage 113. A suitable check valve 115 comprising a valve seat, a ball and a spring is constructed to seal against the small amount of vacuum used to move the first movable member 114 and yet allows pressurized fluid to flow through the feedback passage 113 into the fourth chamber 118 from the outlet passage (not shown). The first movable member 114, when disposed in its first position (as shown), effects a fluid seal between the first chamber 116 and the second chamber (not shown). However, when the fourth chamber 118 is subjected to a source of vacuum via passage 110 and means 112, the movable member 114 will move to its second position until sufficient pressurized fluid has been supplied to said fourth chamber 118 through the feedback passage 115 to cause said member 114 to return to its first position. It will be observed that member 114 may be caused to move from its first position to its second position by the application of a fluid inlet signal into chamber 116 and/or the application of a vacuum to chamber 118 via passage 110.

With respect to controlling the cycling period of the alarm initiating fluid signal as well as the duration thereof, it will be observed that the length of the cycling period depends upon a number of interrelated factors. Upon considering amplification valve 16, it will be observed that the cycling period is initiated where the pressure within chamber 46 has been dissipated through bleed passage 52, a fluid inlet signal has been received within chamber 28 and the diaphragm 60 has moved from its first position to its second position thereby permitting pressurized fluid to flow from chamber 34 into passage 38. An alarm initiating fluid signal occurs when pressurized fluid flows in passage 38. The duration of the alarm initiating fluid signal continues until pressurized fluid no longer flows through passage 38. Cessation of the flow of pressurized fluid through passage 38 occurs when the diaphragm 60 moves back from its second position to its first position. However, diaphragm 60 cannot return to its first position until there has been a sufficient buildup of pressurized fluid within chamber 32. There cannot be a sufficient buildup of pressurized fluid within chamber 32 until diaphragm 54 has returned from its second position to its first position. However, diaphragm 54 cannot return to its first position until there has been a sufficient buildup of pressure within chamber 46. Notwithstanding all of the foregoing, it will be noted that the cessation of flow of pressurized fluid through passage 38 does not constitute the end of the cycling period. Rather, the end of the cycling period occurs only when the pressure within the chamber 46 has been dissipated through the bleed passage 52 (assuming the continued presence of a fluid inlet signal within the chamber 28). Since the flow restrictive means 44 and 45 affect the rate of pressure buildup within chamber 32, the use thereof and the positioning of the valve 45 affects both the cycling period and the duration of the alarm initiating signal. Likewise, the buildup of pressure within chamber 46 is affected by the use of the flow restrictive means 51 and the adjustment thereof within passage 48. In view of the foregoing, it should be now readily apparent as to the manner and method of controlling both the cycling period and duration of the alarm initiating fluid signal of the valve assemblies shown and described herein.

Since each of the various apparatuses shown and described herein is intended primarily for use in different situations, it is to be understood that the designation of a preferred apparatus can only be made where the operating requirements of each situation are fully known. However, the apparatus 10 is currently the preferred apparatus for sensing a change in liquid level of a potential pollutant and producing an alarm initiating output signal in response thereto.

Although several embodiments of the present invention have been illustrated and described, it is anticipated that various changes and modifications will be apparent to those skilled in the art and that such changes may be made without departing from the scope of the present invention, as defined by the following claims. For example, the bleed passage 52 may be constructed as described above or a bleed passage means may be used which is variable in cross-sectional diameter thereby permitting, through simple adjustment means, the selection of a bleed passage of a predetermined cross-sectional area. Additionally, the internal volume of the probe 12 may be selected relative to the internal volume of the conduit 14 in combination with the volume of chamber 28, and primarily the amount of the bias of spring 56, for the purpose of increasing or decreasing the overall sensitivity of the system 10. It will be understood that the use of a probe having a relatively large inner diameter in combination with a conduit 14 having a relatively small inner diameter acts in a manner to minimize the effect that the volume of chamber 28 would have on the operation of the apparatus such that the pressure in chamber 28 will directly follow the immersion of the probe in the sensed fluid. It will be observed that for level sensing under conditions of higher than ambient pressure, the chamber 46 can be disposed in fluid communication such as through bleed passage 52, with the enclosure containing the probe so that the sensing diaphragm 54 will sense a differential pressure. Finally, it will be understood that the probe 12 is formed with a generally tapered inner surface which prevents or minimizes mechanical clogging of the probe with any solidifying type of fluids such as asphalt.

I claim:

1. A fluid operated valve assembly, comprising:
   a. a housing including
      1. a first chamber having first input means adapted to receive a fluid input signal and direct said fluid input signal into said first chamber,
      2. a second chamber constructed to be disposed in fluid commmunication with said first chamber and having second input means adapted to receive a supply of pressurized fluid and direct said pressurized fluid into said second chamber,
      3. a third chamber having third input means adapted to receive a supply of pressurized fluid and direct said pressurized fluid into said third chamber, and
      4. a passage constructed to be disposed in fluid communication with and leading away from said third chamber;
   b. first closure means mounted within said housing and movable between a first biased position for fluid sealing said first chamber from said second chamber and a second position for allowing fluid communication between said first and second chambers, said first closure means being adapted to move from its first position to its second position in response to and during the presence of said fluid input signal within said first chamber;
   c. a second closure means mounted within said housing and movable between a first biased position for fluid sealing said passage from said third chamber and a second position for allowing fluid communication between said passage and said third chamber, said second closure member being adapated to move from its first position to its second position in response to the movement of said first closure member from its first position to its second position whereby to allow pressurized fluid within said third chamber to escape therefrom through said passage; and
   d. a fourth chamber separated from said first chamber by said first closure means, said valve assembly also including means adapted to directly supply pressurized fluid into said fourth chamber in response to escaping pressurized fluid from said passage for moving said first closure means from its second position to its first position regardless of the presence of said input signal within said first chamber whereby to cause said second closure means to move back to its first position from its second position for fluid sealing between said passage and said third chamber.

2. A fluid operated valve assembly according to claim 1 wherein said first and second closure means each includes a diaphragm.

3. A fluid operated valve assembly according to claim 1 wherein said first closure means is constructed to move from its first position to its second position in response to a predetermined change in fluid pressure within said first chamber and wherein the receipt of said input signal within said first chamber causes said predetermined fluid pressure change.

4. A fluid operated valve assembly according to claim 1 wherein said second closure means is designed to move from its first position to its second position in response to a predetermined change in fluid pressure within said second chamber and wherein movement of said first closure means from its first position to its second position causes said predetermined pressure change.

5. A fluid operated valve assembly according to claim 1 wherein said first input means includes an input passage defined in said housing and in fluid communication with said first chamber and wherein movement of said first closure means from its first position to its second position causes fluid under pressure within said second chamber to escape into said first chamber and into said input passage.

6. A valve assembly according to claim 1 including means for controlling the cycling period of said valve assembly.

7. A valve assembly according to claim 6 in which the cycling period control means includes flow restrictive means disposed in the means adapted to direct a supply of pressurized fluid into said fourth chamber.

8. A valve assembly according to claim 6 including means for controlling the cycling period of said valve assembly.

9. A valve assembly according to claim 8 in which said cycling period control means includes flow restrictive means disposed in the second input means of said second chamber.

10. A fluid operated valve assembly according to claim 1 wherein said housing includes a second passage in fluid communication with and leading away from said fourth chamber for removing pressurized fluid from within said fourth chamber.

11. A pressure operated amplification valve assembly for use in a system for sensing a remote specific change in gas pressure, said valve assembly comprising:
a. a first section defining a feedback chamber, a feedback input passage leading into said feedback chamber and an output passage leading out of said feedback chamber;
b. a second section defining a sensing chamber and a signal input passage adapted to receive an input pressure signal in response to said specific change in gas pressure and direct said input signal into said sensing chamber;
c. a third section defining a coupling chamber constructed to be disposed in gas communication with said sensing chamber and an input passage adapted to receive a supply of pressurized gas and direct the pressurized gas into said coupling chamber;
d. a fourth section defining an amplification chamber, an input passage adapted to receive a supply of pressurized gas and direct the pressurized gas into said amplification chamber, and an output opening constructed to be disposed in gas communication with and leading away from said amplification chamber;
e. first diaphragm means for gas sealing said feedback chamber from said sensing chamber and said coupling chamber and movable between a first biased position for gas sealing said coupling chamber from said sensing chamber and a second position for allowing gas communication between said last-mentioned chambers, said first diaphragm means being adapted to move from said first position to said second position in response to the presence of said input pressure signal within said sensing chamber whereby to allow gas under pressure within said coupling chamber to escape into said sensing chamber and its input passage;
f. second diaphragm means gas sealing said coupling chamber from said amplification chamber and movable between a first biased position for fluid sealing said output opening from said amplification chamber and a second position for allowing fluid communication between said output opening and said amplification chamber, said second diaphragm means being adapted to move from its first position to its second position in response to the escape of pressurized gas from within said coupling chamber whereby to allow gas under pressure within said amplification chamber to escape through said output opening for providing an alarm initiating signal; and
g. means adapted to receive a supply of pressurized gas and direct the pressurized gas into said feedback chamber through its input passage in response to the escaping of pressurized gas through said output opening whereby to prevent said first diaphragm means from moving to its second position regardless of the presence of said input pressure signal so as to reseal said output opening, the pressurized gas within said feedback chamber being allowed to escape through said output passage thereof.

12. A valve assembly according to claim 11 including a first spring element positioned within said coupling chamber for biasing said second diaphragm means in its first position and a second spring element positioned within said feedback chamber for biasing said first diaphragm means in its first position.

13. A valve assembly according to claim 11 wherein said last-mentioned means includes feedback means in communication with said output opening for directing a portion of the gas escaping through said output opening to said feedback chamber.

14. A valve assembly according to claim 11 including fluid control means disposed within said feedback means to permit flow of fluid therethrough substantially in only one direction toward said feedback chamber.

* * * * *